2,820,022

RESINOUS PRODUCTS FROM MANNICH BASES OF ALICYCLIC KETONES

Robert W. Martin, Lafayette, Calif., assignor to Shell Development Company, New York, N. Y., a corporation of Delaware No Drawing. Application June 30, 1954
Serial No. 440,541

12 Claims. (Cl. 260—63)

This invention relates to a process for the manufacture of a new resinous product from Mannich bases of alicyclic ketones.

According to the process of the invention, very useful resinous products are obtained by mixing and reacting hydrogen sulfide, a polythiol or mixtures thereof with a Mannich base that is an alicyclic ketone compound containing 4 to 10 ring carbon atoms, one of which is the carbon atom of the carbonyl group, and each alpha carbon atom thereof having linked directly thereto a hydrogen atom and the methylene carbon atom of a tertiary aminomethylene group. For example, hydrogen sulfide is reacted with the Mannich base, 2,5-bis(dimethylaminomethyl)cyclopentanone, to obtain the resinous product having the repeating unit therein indicated in the following equation:

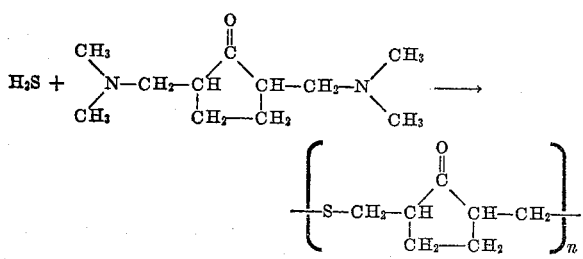

End groups of the polymer chain are probably dimethylamino groups. The resinification occurs with liberation of the secondary amine, dimethylamine.

Particularly useful thermoplastic products of linear character are obtained with use as reactants of a dithiol or hydrogen sulfide, especially the latter. Instead of obtaining such thermoplastic products, sufficient reaction of the amino cyclic ketone with a polythiol containing more than two mercapto groups gives a thermoset resinous product. Partly because of the difficulty and expense of obtaining suitable polythiols, the thermoset products are generally less preferred than the thermoplastic products from reaction of the difunctional ketone compounds with the difunctional hydrogen sulfide or a dithiol. However, by bringing the reactants giving thermoset products together at the place of use, or by only partially reacting them initially so the product is thermoplastic and then completing the reaction at the place of use, these compositions and products are useful in a variety of applications such as molding, impregnating and laminating sheet material, surface coating, etc.

The Mannich bases used in the reaction are derived from an alicyclic ketone and a secondary monoamine. The alicyclic ketone contains the carbon atom of the single carbonyl group as a ring member, and has two hydrogen atoms linked directly to each alpha carbon atom thereof. The aminoketone reactants are obtained by the well-known Mannich reaction wherein the alicyclic ketone is reacted with formaldehyde and a secondary amine, preferably as its hydrochloride salt. In this manner, any of the following typical reactants employed in the process of the present invention are obtained such as 2,4-bis(dimethylaminomethyl)cyclobutanone, 2,5 - bis(diethylaminomethyl)- cyclopentanone, 2,5 - bis(piperidinylmethyl)cyclopentanone, 2,5 - bis(dipropylaminomethyl) - 3 - methylcyclopentanone, 2,5 - bis(methylethylaminomethyl) - 3,3 - dimethylcyclopentanone, 2,5 - bis(dibenzylaminomethyl)- 3 - isopropylcyclopentanone, 2,6 - bis(morpholinomethyl- cyclohexanone, 2,6-bis(dimethylaminomethyl)-3-methylcyclohexanone, 2,6-bis(morpholinomethyl)-4-butylcyclohexanone, 2,5 - bis(didecylaminomethyl) - 3,3 - dimethyl- 4 - sec - butylcyclopentanone, 2,6 - bis(methyl- isopropylaminomethyl) - 3 - isoamyl - 4 - methylcyclohexanone, 2,7-bis(diethylaminomethyl)cycloheptanone, 2,8- bis(piperidinylmethyl)cyclooctanone, 2,10 - bis(benzylmethylaminomethyl)cyclodecanone, 2,5 - bis(beta - dichloroethylaminomethyl)cyclopentanone, and the like. In the aminoketones employed as reactants in the invention, it is only necessary that the substituted alicyclic ketone have linked to each alpha carbon atom thereof, a hydrogen atom and the methylene carbon atom of a tertiary aminomethylene group, which group is derivable from any secondary monoamine. Besides having these essentials of structure, the aminoketone may contain other substituent radicals such as alkyl, alkenyl, aryl, amino, halo, hydroxy, alkoxy, carboxyl or acyloxy groups, whether or not such groups are reactive, such reactive groups merely complicating the resinous structure of the formed products of the invention. The tertiary amino substituent may be either one wherein the nitrogen atom is a member of a heterocyclic ring as in piperidinyl, pyrrolyl or morpholino groups, or wherein the nitrogen atom is linked to two separate radicals as in dimethylamino, benzylmethylamino, and dipropargylamino groups. It is preferred that the aminoketone reactant be free from reactive groups other than the tertiary amino and the carbonyl groups.

The polythiols or polymercaptans used as reactants are of most varied structure. The aminoketones may be reacted with any material or materials containing at least two reactive mercapto —SH groups. They may be aliphatic, alicyclic, aromatic or heterocyclic, saturated or unsaturated and may be monomeric or polymeric. In addition, they may, and preferably do in some instances, contain sulfur and/or oxygen ether linkages within their molecules, and may also be substituted with halogen atoms, hydroxyl groups and the like which are preferably non-reactive.

Simpler polythiols are exemplified by 1,2-ethanedithiol, 1,5-pentanedithiol, 1,4-butanedithiol, 1,4-cyclohexanedithiol, 1,2,4 - butanetrithiol, dimercapto diethylformal (HSC$_2$H$_4$OCH$_2$OC$_2$H$_4$SH), 1,7-decanedithiol, 3,3'-thiodipropanethio, 4,4'-thiodihexanethiol, 3,3'-oxydipropanethiol, 4-hydroxy-1,6-octanedithiol, 1,6-octenedithiol, 1,3-benzenedithiol, 1,4-benzenedithiol, 1,3,5-benzenetrithiol, 4,4-'diphenyldithiol, 2-chloro-1,5-benzenedithiol, tetrahydropyran-2,3-dipropanethiol, dihydrofuran-2,5-butanethiol, sulfolane-2,5-dihexanethiol, furan-2,5-dibutanethiol, 3-hydroxy-2,5-dioctenethiol, and the like. Preferred polythiols used in the process comprise the aliphatic dithiols containing 2 to 18 carbon atoms and the heterocyclic dithiols containing from 7 to 12 carbon atoms. Particularly preferred polythiols are the alkanedithiols and alkenedithiols containing from 2 to 15 carbon atoms, the thiodialkanethiols, thiodialkenethiols, oxydialkanethiols, and oxydialkenethiols containing from 2 to 16 carbon atoms, and the heterocyclic polythiols of the formula HSRXRSH wherein X is a furan, dihydrofuran, tetrahydrofuran, pyran, dihydrofuran and tetrahydropyran ring or their substitutes and R is a divalent diphatic hydrocarbon radical.

Polymeric polythiols may also be used such as are disclosed, for example, in Patrick—U. S. 2,466,963. These include polymers of the formula

HS(CH₂CH₂OCH₂OCH₂CH₂SS)ₙCH₂CH₂OCH₂OCH₂CH₂SH obtained by the oxidation of dimercapto diethyl formal with hydrogen peroxide. Other polythiopolymercaptans are obtained by reacting an organic dihalide with sodium polysulfide to form a high molecular weight polymer containing a plurality of disulfide linkages, and then splitting or degrading that polymer so as to obtain mercapto groups therein as by treating a water dispersion of the polymer with sodium hydrosulfide and sodium sulfite.

The resinous products of the invention are formed by merely mixing the reactants together at ordinary temperature of about 20 to 25° C. It is convenient to start the reaction at ordinary temperature and to complete the reaction at elevated temperature. The use of temperature of about 0 to 100° C. is suitable in general although lower or higher temperatures may be used if desired. The reaction is conducted with either batchwise or continuous mixing of the reactants.

The reaction is usually effected with the reactants in the presence of a solvent. Although water may be used for this purpose, better results are realized with use of a lower alcohol such as methanol, ethanol and the like. Other solvents may be used, if desired, including substances which are also solvents for the resulting polymer. In many cases, phenol, cresol, and boiling dimethyl formamide and cyclohexanone are suitable product solvents.

The reactants are generally brought together in approximately equivalent proportions although a considerable excess or deficiency of one over the other may be used if desired. By equivalent proportions, reference is made to such an amount of the sulfur-containing reactant that the initial mixture contains one sulfhydryl —SH radical for each amino group in the Mannich base. Since the aminoketone contains two of the tertiary amino groups, there is preferably used one mole of hydrogen sulfide or dithiol, or two-thirds of a mole of trithiol with each mole of the aminoketone.

In conducting the reaction, it is convenient to use a salt of the aminoketone—e. g. the hydrochloride salt, since the Mannich bases are often prepared as their salts. In order to effect the resin-forming reaction, the salts are first substantially neutralized with a basic material. When hydrogen sulfide is intended as the sulfur-containing reactant, the aminoketone hydrochloride salt is mixed with a neutralizing amount of alkali metal sulfide whereupon the free base of the aminoketone is formed along with hydrogen sulfide and these two then react to give the resinous product. Additional hydrogen sulfide may be added as desired. In like manner, when a polythiol is used as reactant with the salt of the aminoketone, the polythiol is introduced into the reaction mixture as the corresponding alkali metal mercaptide. If desired, of course, the salt of the aminoketone may be first neutralized separately with caustic before mixing with the sulfur-containing reactant. In order to obtain a resinous product free of salt, it is preferable in forming thermoset products from tri- or higher functional reactants to effect the reaction with use of the free base of the aminoketone and the free sulfhydryl reactant.

The resinification reaction is continued for several to a number of hours after bringing the reactants together. Both elevated temperature and agitation assist in completing the reaction. In the usual case where a solvent for the product is not present, the resinous product is obtained as a precipitate in the reaction mixture. It is recovered by filtration, centrifugation and the like. In order to remove undesirable impurities, the precipitate is ordinarily washed with hot water and hot aliphatic ketones. Since formation of the resinous product produces secondary amines which are valuable byproducts, especially for formation of additional Mannich base, the amines may be recovered from the reaction mixture by customary methods such as distillation, extraction and the like.

The resinous products of the reaction are very useful substances, and this is particularly true of the thermoplastic products from reaction of the Mannich bases with compounds containing two sulfhydryl radicals—i. e. hydrogen sulfide or dithiols. These linear products find application as fibre-forming materials owing to their marked tendency to form crystalline substances. The products from hydrogen sulfide display good draw-down properties which permits cold drawing with obtainment of high tensile strengths. In general, the resinous products are viscous liquids or solids at ordinary temperature.

The invention is illustrated in the following specific examples, but it is to be understood that the invention is not to be construed as limited to details described therein. The parts and percentages are by weight.

*Example 1*

The preparation of a typical Mannich base for use in the process will first be given.

To a heated reaction vessel fitted with a reflux condenser and dropping funnel, there were charged 329 parts of morpholine hydrochloride, 90 parts of paraformaldehyde and 475 parts of absolute ethanol. The mixture was heated and 150 parts of cyclophentanone was slowly added during 1¾ hours to the refluxing mixture. During the addition, a white crystalline solid formed. After addition of the ketone was completed, the mixture was refluxed for an additional 20 minutes. The precipitate was filtered from the mixture while still hot, boiled again in a large proportion absolute alcohol, and recovered by precipitation. When dry, the solid precipitate was dissolved in the minimum amount of water which would give a clear solution. The solution was filtered, and acetone added to the filtrate to reprecipitate the product.

The yield of crude product was 60.2%; that of the purified material was 46%. The 2,5-bis(morpholinomethyl)cyclophentanone dihydrochloride was a white crystalline solid having a melting point of 195° C. Analysis showed a nitrogen content of 7.83% as compared to a theory of 7.89%.

*Example 2*

In a reaction vessel equipped with a heater, stirrer, reflux condenser, gas inlet device, and thermometer, there was placed 35.5 parts (0.1 mole) of 2,5-bis(mopholinomethyl)cyclopentanone dihydrochloride. A mixture of about 240 parts of methanol and 24 parts (0.1 mole) of Na₂S·H₂O dissolved in 75 parts of water was added. The mixture was stirred and a slow stream of H₂S bubbled through the solution at room temperature (about 20-25° C.) for about 16 hours. Then the mixture was heated to reflux temperature and H₂S again passed through the mixture for another 6 hours. The solvent layer was decanted and the resin was dissolved in boiling cyclohexanone. The solution was filtered and poured into about 1600 parts of methanol with stirring. The resin which precipitated was collected and boiled with three portions of water. The resin was dried by heating for one hour at 90° C. and finally at 105° C. for one-half hour. It was molded at 130° C. into a sheet of 50 mils thickness.

The resin was a very pale tan color. Pieces were cut from the molded sheet and tested for tensile strength by use of an Instron tester. One set of samples was heated to destroy crystallites and then cold drawn into a fiber before test. The tensile strength of two such samples was 11,000 and 13,000 p. s. i. (pounds per square inch). Another set of samples was cold drawn from resin that had first been allowed to crystallize at room temperature. Three of these samples showed tensile strengths of 10,100, 11,400 and 10,400 p. s. i. The force necessary to cold draw the resin was about 915 p. s. i. with about 1300 p. s. i. being required to start the drawing process. There was about 400% elongation on drawing.

The X-ray diffraction data of the resin showed random crystallization in the undrawn product, and highly oriented crystallization in the drawn state.

Samples of the resin were placed in the organic solvents tabulated below at room temperature to test solubility in the listed times. The following results were obtained.

| Solvent | 19 hours | 6 days |
|---|---|---|
| Acetic acid | Unaffected | Unaffected. |
| Acetonitrile | Practically unaffected | Very slight softening. |
| Butanone | Unaffected | Do. |
| Carbon tetrachloride | do | Unaffected. |
| Cyclohexanone | Swollen | Essentially dissolved. |
| Dioxane | do | Easily broken to powder. |
| Isopropanol | Unaffected | Unaffected. |
| Pyridine | Dissolved | Dissolved. |
| Tetrahydrofuran | Swollen | Essentially all dissolved. |
| Toluene | Unaffected | Slight softening. |

Another set of samples was placed in the following aqueous solutions at room temperature with the following results in the indicated times.

| | 5 days | 12 days |
|---|---|---|
| 10% HCl | No effect | No effect. |
| 36% HCl | Black surface | Do. |
| 10% HNO₃ | No effect | Do. |
| 10% H₂SO₄ | do | Do. |
| 10% NaOH | do | Do. |
| 50% NaOH | Yellow surface | Yellow softened surface. |
| 28% NH₄OH | No effect | No effect. |

The intrinsic viscosity of the resin was determined from viscosity measurements at 100° F. of solutions of the resin in cyclohexanone. A value of 0.390 was obtained.

Analysis of the resin gave the following results. The calculated values are for a polymer with a repeating unit of

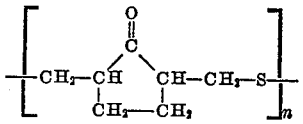

| | Found | Calculated |
|---|---|---|
| | Percent | Percent |
| Carbon | 58.17 | 59.2 |
| Hydrogen | 6.87 | 7.05 |
| Nitrogen | 0.14 | 0.00 |
| Sulfur | 23.2 | 22.5 |

*Example 3*

Another quantity of the resin was prepared in the same manner as described in Example 2. In order to establish that ketone groups from the cyclopentanone remained in the resin, the oxime thereof was prepared. Analysis of the oxime gave 8.2% nitrogen. The calculated value is 8.9%.

*Example 4*

A co-condensation product was prepared by reacting 2,5-bis(morpholinomethyl)cyclopentanone with pentamethlyene dimercaptan and hydrogen sulfide.

In a reaction vessel fitted as described in Example 2, there was placed 17.75 parts of 2,5-bis(morpholinomethyl)cyclopentanone dihydrochloride and 40 parts of methanol. To the salt was added with stirring 1 part of NaOH dissolved in 15 parts of water and 3.4 parts of pentamethylene dimercaptan. The mixture was heated with stirring at about 44–55° C. for ¾ hour, and was then refluxed for an additional 1¼ hours. The mixture was next cooled to about 37° C. and H₂S was bubbled through the reaction mixture while it was held at reflux for about 4½ hours. The aqueous layer was decanted from the resin. The resin was dissolved in cyclohexanone and reprecipitated by addition of methanol. The resin was a liquid at 100° C. and was a highly viscous material at room temperature.

I claim as my invention:

1. A process for the manufacture of a resinous product which comprises mixing and reacting at about 0 to 100° C. a substance selected from the group consisting of hydrogen sulfide, a polymercaptan, and mixtures thereof with an alicyclic ketone containing 4 to 10 ring carbon atoms, one of which is the carbon atom of the carbonyl group, and having a hydrogen atom and the methylene carbon atom of a tertiary aminomethylene group linked directly to each of the two ring carbon atoms directly adjacent to the carbonyl group, in which reaction the sulfur atom of a sulfhydryl group from the first-mentioned reactant replaces the nitrogen atom in said tertiary aminomethylene group and the corresponding secondary amine is liberated.

2. The resinous product obtained according to the process of claim 1.

3. A process for the manufacture of a resinous product which comprises mixing and reacting at about 0 to 100° C. hydrogen sulfide with an alicyclic ketone containing 4 to 10 ring carbon atoms, one of which is the carbon atom of the carbonyl group, and having a hydrogen atom and the methylene carbon atom of a tertiary aminomethylene group linked directly to each of the two ring carbon atoms directly adjacent to the carbonyl groups, in which reaction the sulfur atom from the hydrogen sulfide replaces the nitrogen atom in said tertiary aminomethylene group and the corresponding secondary amine is liberated.

4. The resinous product obtained according to the process of claim 3.

5. A process for the manufacture of a resinous product which comprises mixing and reacting at about 0 to 100° C. a polymercaptan with an alicyclic ketone containing 4 to 10 ring carbon atoms, one of which is the carbon atom of the carbonyl group, and having a hydrogen atom and the methylene carbon atom of a tertiary aminomethylene group linked directly to each of the two ring carbon atoms directly adjacent to the carbonyl group, in which reaction the sulfur atom of a sulfhydryl group from the polymercaptan replaces the nitrogen atom in said tertiary aminomethylene group and the corresponding secondary amine is liberated.

6. The resinous product obtained according to the process of claim 5.

7. A process for the manufacture of a resinous product which comprises mixing and reacting at about 0 to 100° C. a substance selected from the group consisting of hydrogen sulfide, a polymercaptan, and mixtures thereof with a cyclopentanone having a hydrogen atom and the methylene carbon atom of a tertiary aminomethylene group linked directly to each of the two ring carbon atoms directly adjacent to the carbonyl group, in which reaction the sulfur atom of a sulhydryl group from the first-mentioned reactant replaces the nitrogen atom in said tertiary aminomethylene group and the corresponding secondary amine is liberated.

8. The resinous product obtained according to the process of claim 7.

9. A process for the manufacture of a thermoplastic resinous product which comprises mixing and reacting at about 0 to 100° C. 2,5-bis(morpholinomethyl)cyclopentanone with hydrogen sulfide, in which reaction the sulfur atom from the hydrogen sulfide replaces the nitrogen atom in the morpholinomethyl group in the cyclopentanone compound and morpholine is liberated.

10. The resinous product obtained according to the process of claim 9 which contains repeating units in the molecules thereof of the formula:

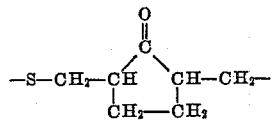

11. A process for the manufacture of a thermoplastic resinous product which comprises mixing and reacting at about 0 to 100° C. 2,5-bis(morpholinomethyl)cyclopentanone with pentamethylene dimercaptan, in which reaction the sulfur atom of a sulfhydryl group from said dimercaptan replaces the nitrogen atom in the morpholinomethyl group in the cyclopentanone compound and morpholine is liberated.

12. The resinous product obtained according to the process defined by claim 11 which contains repeating units in the molecules thereof of the formula:

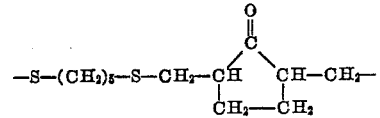

References Cited in the file of this patent

Degering: Organic Chem., 6th ed. (1951), Coll. Outline Series; publ. by Barnes & Noble, Inc., New York, N. Y., page 93.

Hackh's Chem. Dictionary, 3rd ed. (1944), pages 850 and 851; publ. by McGraw-Hill Book Comp., Inc., New York, N. Y.